J. F. WILHELM.
NUT LOCK.
APPLICATION FILED MAY 5, 1916. RENEWED JULY 5, 1917.

1,241,181. Patented Sept. 25, 1917.

John F. Wilhelm,
Inventor
By his Attorney James F. Duhamel

UNITED STATES PATENT OFFICE.

JOHN FREDERICK WILHELM, OF BUFFALO, NEW YORK.

NUT-LOCK.

1,241,181.  Specification of Letters Patent.  Patented Sept. 25, 1917.

Application filed May 5, 1916, Serial No. 95,561. Renewed July 5, 1917. Serial No. 178,786.

*To all whom it may concern:*

Be it known that I, JOHN FREDERICK WILHELM, a citizen of the United States, and resident of Buffalo, in the county of Erie and State of New York, have invented certain new and useful Improvements in Nut-Locks, of which the following is a specification.

This invention relates to nut locks and its object is to provide the end of the bolt on which the nut is fitted with a washer having depending flanges to engage the sides of the nut and upwardly extending fingers to be bent into the slot of the screw, securing the washer and preventing its being turned. The washer is also provided with means for connecting it with the bolt itself and prevents either from turning independently of the other and the nut may be adjusted at any time without the removal of any of the parts of the lock, but by simply bending up the flanges. These and other objects and details of the device are more fully described in the following specification, set forth in the claims and illustrated in the accompanying drawings, wherein:

This lock consists of but two parts, a screw 10 fitting into the tapped end of the bolt 11 and a washer 12 secured on the end of said bolt by the screw.

Figure 6:
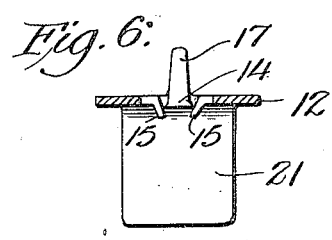
Fig. 6 is a sectional view of the same on the line 6—6 of Fig. 5.

The washer 12 is a strip of sheet metal having a central opening 13 for the passage of the screw, and lateral slots 14 from which are punched the prongs 15 adapted to fit in notches or castellations 16 in the end of the bolt. From the slots 14 are also punched the fingers 17 extending upward as shown in Fig. 6 but adapted to be bent downward into the slot 18 of the screw head 19 and thus so connect the washer and screw that they cannot move independently of each other.

The object of the prongs 15 and the castellations at the end of the bolt is to also connect all of the parts so that there can be no independent movement of them. The nut 20 is locked and held against rotation by flanges depending and bent from the washers 12 and fitting against opposite sides of the nut 11.

The flanges 21 may be permanently formed and it will be seen that the nut may be adjusted quite a distance along the screw and still be retained from rotation by the flanges. As the washer is of thin flexible metal the flanges may be bent down after the nut is adjusted or may be turned upward when it is desired to again turn the nut for adjustment.

Figure 1:
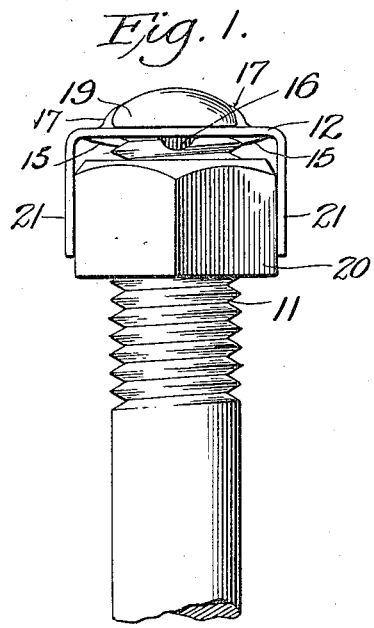
Figure 1 is a side elevation of the threaded end of a bolt with the improved lock applied to the nut thereon.
Figure 2:
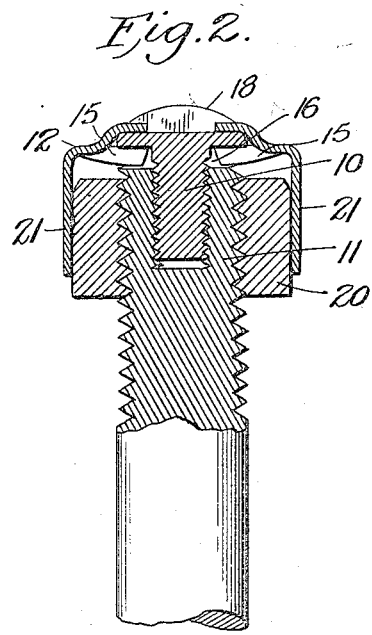
Fig. 2 is a vertical sectional view of the same.
Figure 3:
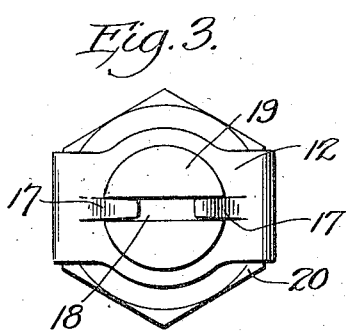
Fig. 3 is a plan view of the lock and nut.
Figure 4:
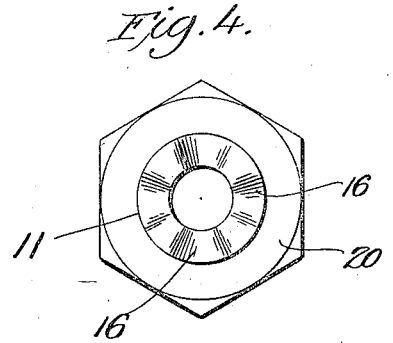
Fig. 4 is a plan view of the nut and the end of the bolt.
Figure 5:
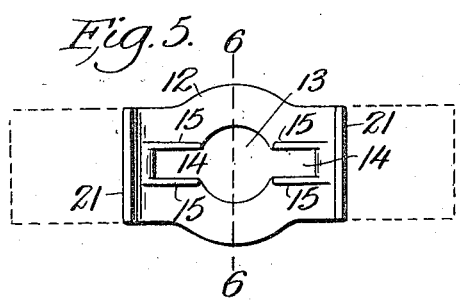
Fig. 5 is an under view of the washer.

In assembling the lock the washer may be preferably formed as shown in the drawings, or in the dotted lines in Fig. 5, and the adjustment of the bolt effected before the flanges are turned down. While the fingers 17 are elevated the washer is put in place on the end of the bolt so that the flanges will embrace opposite sides. The screw 10 is now driven in place at the end of the bolt so that its head holds the prongs 15 in the notches 16 of the castellated bolt end and the fingers 17 are bent down into the slot 18. The screw is thus locked to the nut by the washer through the fingers 17 and the flanges 21 and it is also locked to the bolt through the fingers and the prongs 15, preventing the rotation of any of the parts until either the fingers or the flanges are raised.

The minimum number of parts is an element of safety in a nut lock as the weakness of one part may cause the failure of the whole to operate properly. The two parts of this device may be made of sufficiently substantial material to guarantee its efficiency.

The ease with which this lock is assembled or released is a very desirable feature and when the flanges are bent to remove the lock, they may be readily reformed for the same work many times. This makes the lock a desirable feature in temporary-work where the parts are to be hastily assembled and separated.

It is obvious that the parts may be otherwise arranged or modified without departing from the essential features above described or from the scope of the appended claims.

What I claim as new is:

1. In a nut lock, the combination with a bolt having indents and a tapped hole at its end, of a screw for the hole, a nut, and means connected with the indents and preventing the rotation of the nut and the screw.

2. In a nut lock, the combination with a bolt and nut, of a screw for the end of the bolt, and a washer having flanges, fingers and prongs adapted to separately engage the nut, screw and bolt and lock them against independent movement.

3. In a nut lock, the combination with a bolt having a notched end, of a nut for the bolt, a screw for the end of the bolt, and a washer having prongs for the notches, flanges for the nut and fingers for the slot of the head of the screw to hold the same from independent rotation.

4. In a nut lock, the combination with a bolt having a notched end and tapped at the same end, of a screw to fit the end of the bolt, a nut, a washer with depending flanges to engage the sides of the nut, prongs on the washer to fit the notches of the bolt, and fingers on the upper side of the washer adapted to be bent into the slot of the screw.

5. In a nut lock, the combination with a bolt tapped at its end and having notches thereat, of a screw for the end of the bolt, a nut, a washer adapted to be held in place by the screw, fingers on the washer to prevent the rotation of the screw, prongs on the under side of the washer to fit the notches, and flanges adapted to be bent below the notches to fit the sides of the nut.

Signed at Buffalo, in the county of Erie and State of New York, this 18th day of April, A. D., 1916.

JOHN FREDERICK WILHELM.

Witnesses:
H. L. SPRICKMAN,
EDW. C. FLIERL.